(12) United States Patent
Lyon et al.

(10) Patent No.: US 7,372,366 B2
(45) Date of Patent: May 13, 2008

(54) SEAL METHOD AND SYSTEM FOR PACKAGES

(75) Inventors: Geoff Lyon, Menlo Park, CA (US);
Salil Pradhan, Santa Clara, CA (US);
Bill Serra, Montara, CA (US); Alipio Caban, Arecibo, PR (US); Jorge E. Badillo, Rincon, PR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 180 days.

(21) Appl. No.: 11/125,559

(22) Filed: May 10, 2005

(65) Prior Publication Data

US 2006/0255953 A1 Nov. 16, 2006

(51) Int. Cl.
*G08B 13/14* (2006.01)

(52) U.S. Cl. .............. 340/572.8; 340/572.1; 340/572.7; 340/572.4

(58) Field of Classification Search .. 340/572.1–572.9; 235/492
See application file for complete search history.

(56) References Cited

U.S. PATENT DOCUMENTS

| | | | | |
|---|---|---|---|---|
| 5,608,417 | A * | 3/1997 | de Vall | 343/895 |
| 6,078,258 | A * | 6/2000 | Auerbach et al. | 340/568.2 |
| 6,891,474 | B1 * | 5/2005 | Fletcher | 340/572.1 |
| 7,006,014 | B1 * | 2/2006 | Henty | 341/22 |
| 7,017,807 | B2 * | 3/2006 | Kipp et al. | 235/385 |
| 7,095,326 | B2 * | 8/2006 | Young et al. | 340/572.4 |
| 2003/0235027 | A1 * | 12/2003 | Smeyak et al. | 361/679 |
| 2004/0066296 | A1 * | 4/2004 | Atherton | 340/572.1 |
| 2004/0104274 | A1 * | 6/2004 | Kotik et al. | 235/492 |
| 2005/0128087 | A1 * | 6/2005 | Claessens et al. | 340/572.8 |
| 2005/0237154 | A1 * | 10/2005 | Kafry et al. | 340/10.1 |
| 2005/0242957 | A1 * | 11/2005 | Lindsay et al. | 340/572.7 |
| 2007/0139205 | A1 * | 6/2007 | Tanaka et al. | 340/572.8 |

* cited by examiner

*Primary Examiner*—Benjamin C. Lee
*Assistant Examiner*—Hoi C. Lau (57) ABSTRACT

A seal for a package includes a circuit having electrical characteristics that change under mechanical deformation and an attaching material coupled to the circuit and for attaching the circuit to the package. The seal is attached to the package and processed prior to shipping to establish an untampered state for the seal. This includes identifying a circuit on the sealed package according to a seal type associated with the seal, recording one or more characteristics associated with the circuit from the seal and storing the seal type and one or more characteristics associated with the circuit from the seal for later comparison. To detect tampering to the package, the seal type and corresponding seal and circuit for the seal is identified, the characteristics associated with a circuit from the seal are determined and compared with the previous characteristics recorded when the seal was initially applied to the package. If the comparison indicates that a mechanical deformation of the seal occurred, it is possible the seal and package were tampered with during shipment or delivery.

31 Claims, 5 Drawing Sheets

SEAL METHOD AND SYSTEM FOR PACKAGES

BACKGROUND

The present invention relates generally to packaging. Each product design also includes a package design to contain the product for shipping and delivery. Some of the design considerations for packaging include product display, mechanical protection and security for the product contained therein. Security is often a key element in package design for pharmaceuticals, foodstuffs and high-value items.

Security assures consumers that consumable items such as medicines have not been tampered with and that high-value items are genuine. Secure packaging for a consumable may take the form of a container with a frangible seal that is broken or deformed upon opening the container. Packages for high-value items may be closed with a seal that deforms upon opening the package. While such packaging may be described as "tamper proof," they are generally "tamper evident." Unfortunately, evidence of tampering requires a close and careful visual inspection of the package before and after it is opened. Accordingly, many tampered items go undetected if the visual inspection is not made or not made carefully.

Tampering can also be performed by more sophisticated methods. A person and/or a machine can carefully remove and replace seals on a package without deforming the seal enough for visual detection. In some cases, it is also possible to create counterfeit seals that appear visually identical. These counterfeit seals replace the original seals on the package after the product is tampered with or replaced.

Tampering may take several forms. It may involve the simple theft of the contents of a package, it may involve the substitution of counterfeit material for genuine material, or it may involve the malicious introduction of harmful material into the package. The parties performing the tampering generally are motivated by economic gain however they may have other ulterior motives as well. Consequently, while the theft of material from a package can lead to economic loss, counterfeit pharmaceuticals or pharmaceutical packages containing harmful materials can endanger human life.

Packaged products shipped domestically and internationally are in the custody of many different parties before reaching the final seller or buyer. A product package may leave a factory containing a genuine article and arrive at a retailer containing a counterfeit. If tampering occurs, it is often difficult to determine where in the distribution system it occurred. Close visual inspection of every package at each stage of shipment to insure that all packages are tamper-free is highly problematic in terms of labor costs and shipping delay.

It is desirable to have a packaging and distribution system for delivering tamper-free products. To achieve this, the distribution system should facilitate quick detection and elimination of counterfeit or tampered products. If this were currently possible, product tampering would be deterred and economic losses would be reduced. Reduced product tampering would also increase consumer confidence in product integrity and reliability.

BRIEF DESCRIPTION OF THE DRAWINGS

The present invention is illustrated by way of example and not limitation in the figures of the accompanying drawings in which.

Like reference numbers and designations in the various drawings indicate like elements.

SUMMARY OF THE INVENTION

One aspect of the present invention features a seal for a package having a circuit with electrical characteristics that change under mechanical deformation and an attaching material coupled to the circuit and for attaching the circuit to the package.

Another aspect of the present invention features a method of sealing a package with a seal to detect tampering. The operation includes identifying a circuit on the sealed package according to a seal type associated with the seal, recording one or more characteristics associated with the circuit from the seal and storing the seal type and one or more characteristics associated with the circuit from the seal to establish an untampered state for the seal.

Yet another aspect of the present invention features a method of detecting tampering to a package having a seal. The detection operation includes identifying a seal type and corresponding seal and circuit for the seal attached to the package, determining one or more characteristics associated with a circuit from the seal on the package, receiving one or more previous characteristics recorded when the seal was initially applied to the package and comparing the one or more characteristics with the one or more previous characteristics to determine if a mechanical deformation of the seal may have occurred.

DETAILED DESCRIPTION

Aspects of the present invention concern a seal for a package having a circuit that changes electrical characteristics upon mechanical deformation and an attaching material for attaching the seal and the circuit to a package for a product. Depending on the particular application, the circuit in the seal is designed to emit a certain waveform or signal in the presence of an electromagnetic wave. Tampering with the package and the seal deforms the circuit and changes the expected waveform or signal produced by the circuit when it was originally applied to the packaging. A large volume of packages can be scanned in this manner and the tampered packages readily identified.

Aspects of the present invention are advantageous in at least one or more of the following ways. Tampering can be detected at many points in a distribution system for products. Packages having a seal designed in accordance with the present invention can quickly pass through a machine that generates an electromagnetic wave and measures the resulting waveform or signal. The resulting waveform is compared against a database of original waveform measurements thereby allowing a rapid determination of tampering.

Seals cannot be readily removed, replaced or counterfeited. Each seal is scanned during packaging and a signal response for the package is recorded for later comparison and verification. Even if the same seal is used on several packages, a different signal response results from the small deformations to the seal as it is attached to the package. Accordingly, counterfeit seals can be detected as it is very unlikely the same signature signal response would result from a newly applied replacement seal to a package. To further secure the packaging, different circuit designs can be used in the seals and they can be changed frequently to avoid detection and possible reverse-engineering.

Figure 1:
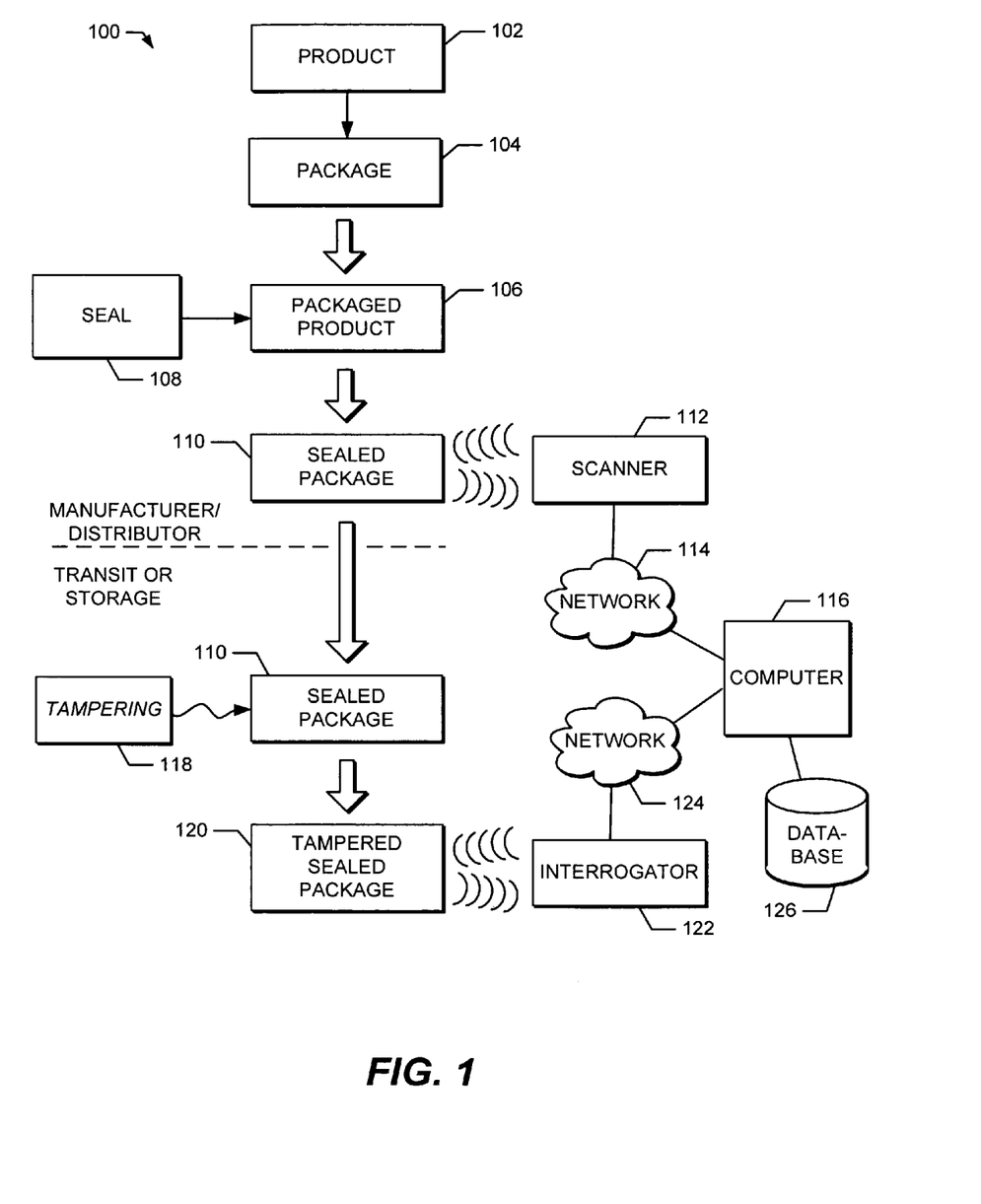
FIG. 1 is a flow diagram illustrating the use of a seal containing an embedded circuit to detect tampering to a sealed package in accordance with one implementation of the present invention.

Distribution system 100 in FIG. 1 depicts the use of seals to detect tampering in accordance with one implementation of the present invention. A product 102 can be produced by a manufacturer or processed by a distributor responsible for the packaging and delivery of product 102. Typically, product 102 can be any item that needs to be delivered securely and without tampering. For example, these types of products include: pharmaceuticals, foodstuffs and high-value items. Without the security features of distribution system 100, these products might be subject to counterfeiters and others seeking economic gain by introducing substandard products into the stream of commerce. Accordingly, security features of system 100 help reduce economic loss caused by counterfeiters as well as increase the likelihood of detecting these knocked-off products.

Product 102 is initially placed in a package 104 engineered to safely carry product 102 during shipping and delivery. Package 104 can be designed to withstand mechanical shock and vibration to product 102 as well as be used to display product 102 for retail display. In addition, package 104 is designed to receive an attaching material and deformable circuit 108 hereinafter, seal 108) designed in accordance with implementations of the present invention. For example, package 104 is designed to include a strategic location for receiving seal 108 and facilitate securing product 102 in package 104.

As previously described, seal 108 includes a circuit and an attaching material in accordance with implementations of the present invention. Because seal 108 has this attaching material it can be placed on package 104 and operate as a closure to close or shut the package. However, closing package 104 is only one benefit of seal 108 and is not a requirement for its operation. Instead, seal 108 uses a circuit to detect tampering and can be attached to many different areas on package 104. As will be described in further detail later herein, seal 108 is placed on a package most likely to become mechanically deformed due to tampering or opening the package. For example, seal 108 can be attached to package 104 and detect tampering without necessarily operation as a closure that keeps package 104 closed.

A packaged product 106 is a package that has received product 102 and has been closed in preparation to receive seat 108. In one implementation, seal 108 is placed on packaged product 106 using one or more attaching materials to operate as a closure to packaged product 106 as well as for tamper detection in accordance with implementations of the present invention. For example, seal 108 can be attached to packaged product 106 using a glue material, using application of heat, staples, rivets, metal fasteners, laminates, lithographically or can be attached using a chemical reagent. Alternatively, a purely adhesive material is used to close package product 106 and not seal 108. Instead, seal 108 is placed on packaged product 106 to detect tampering but not to operate as a closure on packaged product 106. In general, the application of an adhesive or other material used to attach seal 108 to packaged product 106 should not damage seal 108 and yet be strong enough that seal 108 is not easy to remove.

The resulting sealed package 110 includes carefully placed seal 108 on packaged product 106. At this point, a scanner 112 operates upon sealed package 110 to identify one or more characteristics associated with seal 108. Depending on the design of system 100, scanner 112 can be moved over sealed package 110 or, alternatively, scanner 112 can be in a fixed position and sealed package 110 can be moved along with other sealed packages past the scanner. In one implementation, scanner 112 emits electromagnetic waves causing seal 108 on sealed package 110 to emit an identifiable set of one or more characteristics. For example, the characteristics from the circuit in seal 108 can be a waveform with resonant impedance at a given frequency. Further details of this resonant impedance for seal 108 is described later herein.

Optionally, scanner 112 can also read a tag on product 102 that individually identifies product 102. For example, the tag on product 102 can be a radio frequency identification (RFID) tag that distinguishes product 102 from other products. This identifier for product 102 can also be used to individually associate product 102 with seal 108. In a similar manner, scanner 112 can read and utilize barcodes attached to product 102 instead of an RFID tag if a line of sight between scanner 112 and product 102 is possible.

Eventually, characteristics from seal 108 are transmitted over a network 114 to computer 116 and database 126. These records in database 102 cross reference the characteristics associated with seal 108 to sealed package 110 and the contents contained within. Optionally, these records in database 126 can also reference identifiers from RFID, barcode or other tags to individually cross reference a specific product 102 having the tag with the particular seal 108 as applied.

Information in database 126 can be used in several ways. Generally, characteristics associated with seal 108 establish an untampered state for seal 108 as applied to sealed package 110. The characteristics from seal 108 as applied can be combined with the characteristics from other seals (not shown) to provide a range of values indicating an untampered state of seals when applied to packages with products. For example, an untampered state for a batch of seals may cover a range of values from 0.04 to 0.07. This would be useful when shipping or delivering a batch of products and it is desired to determine if tampering has occurred with any product in the batch. It is also possible to track an individual product 102 by additionally referencing a tag identifier from product 102. This tag identifier from an RFID or barcode tag can be cross referenced with specific characteristics of seal 108 to detect tampering with a specific product 102. For example, individual tracking of a product by an identifier is useful when dealing with high-value items susceptible to tampering or counterfeiting.

Sealed package 110 travels from a manufacturer/distributor and at various times can be either in transit or storage. At almost any time or location during this travel, tampering 118 of sealed package 110 can occur. Tampering 118 does not necessarily have to result in the removal or replacement of product 102 as long as sealed package 110 has been sufficiently disturbed to change seal 108. For example, it is contemplated that tampering of seal 108 may be too small for visual detection yet can still be detected using one or more implementations of the present invention. In general, tampering caused from bending, breaking, burning, removing, stretching, cutting, heating, moistening, tearing and perforating any part of sealed package 110 may result in small or large mechanical deformations of the circuit in seal 108.

Accordingly, tampered sealed package 120 is scanned again by interrogator 122 to detect the changes to seal 108 of tampered sealed package 120. In this example, interrogator 122 transmits electromagnetic waves to tampered sealed package 120 and again determines characteristics of the circuit in seal 108. If tampered sealed package 120 has been deformed then the characteristics of the circuit in seal 108 will not match the previous characteristics of the circuit as stored in database 126 prior to shipping. If interrogator 122 is capable of reading an RFID tag, barcode or other tag then tampered sealed package 120 can be specifically identified and a previous characteristic of seal 108 specific to product 102 in sealed package 110 is used to make the tamper determination. Otherwise, a range of acceptable values from the characteristics of various different seals like seal 108 as applied are used to determine whether tampering has occurred or not. Of course, if the characteristics of the circuit in seal 108 are within the acceptable range then sealed package 110 is deemed not tampered with (not shown) and no further action is required.

Figure 2A:
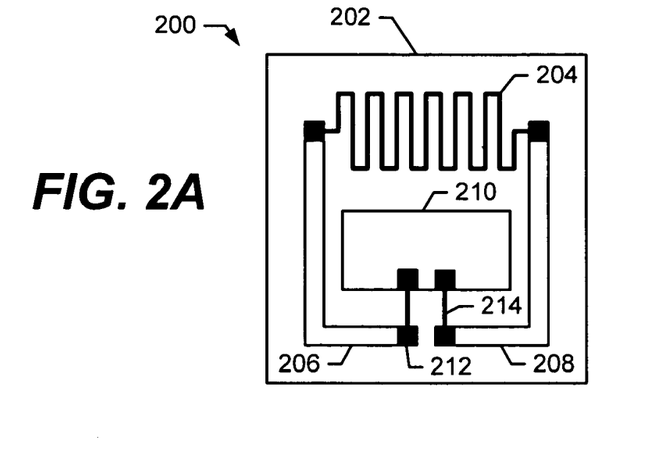
FIG. 2A is a block diagram of a seal containing an embedded circuit in accordance with one implementation of the present invention.

FIG. 2A is a diagram of a seal 200 designed in accordance with one implementation of the present invention. Seal 200 includes a circuit and an attaching material 202 used to attach the circuit to a product or package. In the one implementation as illustrated, the circuit components of seal 200 include an inductor 204, a first resistor 206, a second resistor 208, a capacitor 210 coupled to the resistors through a first lead 212 and a second lead 214 respectively. The circuit can be embedded under at least one layer of material forming the seal using a lamination operation or may even be printed onto one or more layers of the material forming the seal. This particular combination of components forms a parallel-resonant circuit having a predetermined impedance characteristic. For example, the parallel-resonant circuit tends to have increased impedance under the influence of an electromagnetic wave approaching or at the circuit's resonant frequency.

Figure 2B:
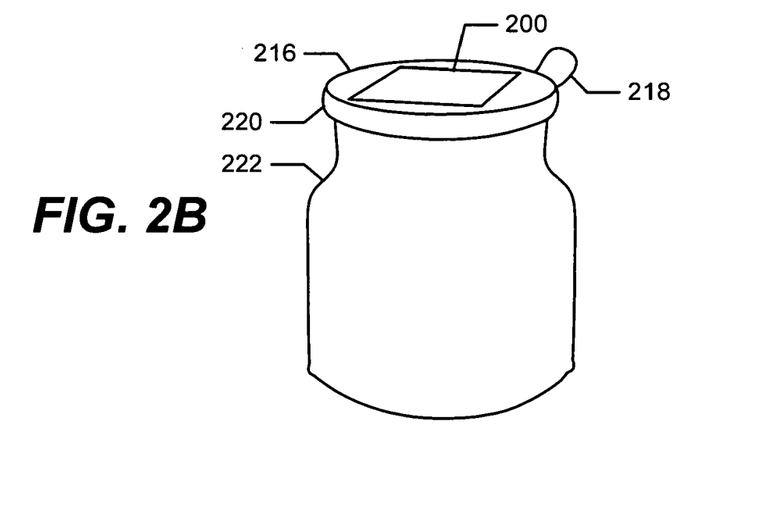
FIG. 2B is a perspective diagram of a bottle closed with a seal containing an embedded circuit in accordance with one implementation of the present invention.

FIG. 2B depicts seal 200 designed in accordance with another implementation of the present invention as applied to a bottle for packaging pills. Bottle 222 is another example of a package to be used with implementations of the present invention. In this example, bottle 222 has an opening 220 closed with a cover 216 having pull-tab 218. Seal 200 is affixed to cover 216 after bottle 222 is filled with vitamins, pills or other pharmaceuticals and opening 220 is closed. It should be recognized in this example that seal 200 is not necessarily operating as a closure that keeps cover 216 on bottle 222. Instead, seal 200 is placed in a position most likely to receive mechanical deformation as a bottle 222 is opened or tampered with.

Taking cover 216 off using pull-tab 218 deforms both cover 216 and seal 200 causing the circuit in seal 200 to change its electrical characteristics and/or resonant frequency. Even if cover 216 is tampered with but not removed, the circuit in seal 200 also experiences sufficient mechanical deformation to alter the resonant frequency or other electrical characteristics a detectable amount.

Figure 2C:
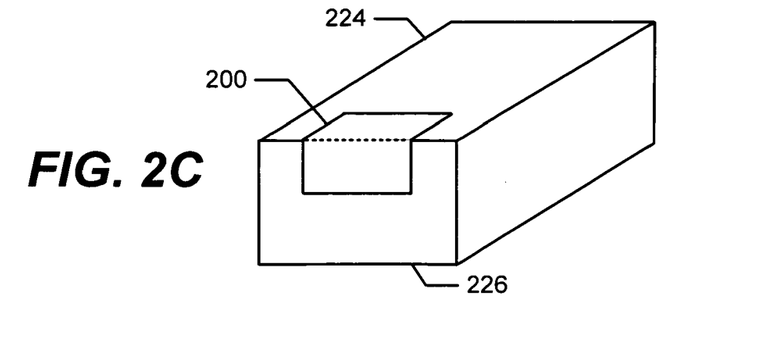
FIG. 2C is a perspective diagram of a box closed with a seal containing an embedded circuit in accordance with one implementation of the present invention.

FIG. 2C illustrates another application of seal 200 designed in accordance with another implementation of the present invention and applied to a box type of packaging. In this example, box 224 has an opening covered by lid 226 and secured using seal 200. In contrast to the example in FIG. 2B, seal 200 operates as both a closure to box 224 and to detect tampering. For instance, opening box 224 through the opening covered by lid 226 requires breaking seal 200 thus clearly altering the circuit's characteristics. Breaking seal 200 might break a resistor in half making the circuit appear to have a resistor with infinite resistance. Likewise, tampering with lid 226 but not breaking seal 200 also alters the electrical characteristics and/or resonant frequency of the circuit in seal 200. For example, partially removing seal 200 from lid 226 and then resealing would inadvertently bend seal 200 and cause the associated resistors 206/208, capacitor 210 or inductor 204 within the circuit of seal 200 to operate differently. As a result of changing one or more of these circuit components, the altered circuit in seal 200 will respond differently to various electromagnetic frequencies.

Figure 3A:
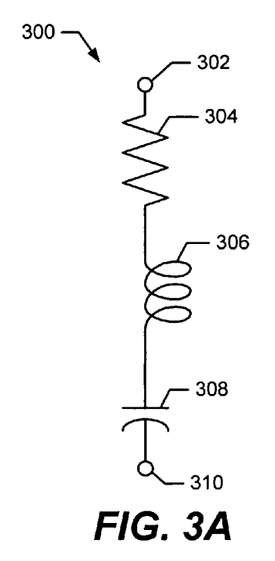
FIG. 3A is a schematic diagram of a series-resonant circuit in accordance with one implementation of the present invention.
Figure 3B:
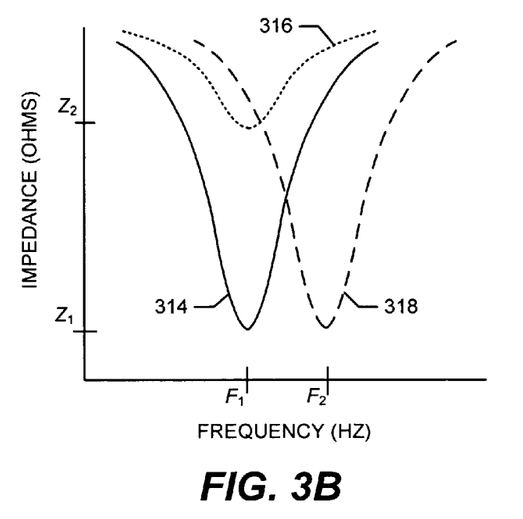
FIG. 3B is a graph illustrating the frequency response of a series-resonant circuit in accordance with one implementation of the present invention.

FIG. 3A and FIG. 3B illustrate a series-resonant circuit and corresponding impedance curves for a seal designed in accordance with one implementation of the present invention. Series-resonant circuit 300 has a first terminal 302 coupled in series with a resistor 304, an inductor 306, a capacitor 308 and ending at a second terminal 310. A packaged having a seal with series-resonant circuit 300 is exposed to an electromagnetic wave at a first resonant frequency ($F_1$) and responds with a corresponding first impedance curve 314 as illustrated in FIG. 3B. As is apparent from this illustration, series-resonant circuit 300 has a reduced impedance response as the electromagnetic wave approaches the resonant frequency of the circuit. For example, the impedance of an untampered with series-resonant circuit 300 decreases to either $Z_2$ or $Z_1$ as the electromagnetic wave approaches first resonant frequency ($F_1$). Effects of inductor 306 and capacitor 308 are reduced at this first resonant frequency ($F_1$) leaving the impedance at pole $Z_2$ or $Z_1$ as illustrated.

The first impedance curve 314 and resonant frequency establishes an initial untampered state for the seal having series-resonant circuit 300. Subsequent removal or tampering with the seal deforms series-resonant circuit 300 and alters first impedance curve 314. In one case, tampering modifies resistor 304 and increases the overall effective resistance in series-resonant circuit 300. This increased resistance decreases the Q of the circuit resulting in a second impedance curve 316 having a less pronounced minima and higher impedance $Z_2$ compared with first impedance curve 314. Alternatively, tampering that decreases the resistance in resistor 304 and in circuit 300 would tend to increase Q creating an impedance curve with a more pronounced minima and lower impedance (not shown) compared with first impedance curve 314. While the higher Q and more pronounced minima is desired, even second impedance curve 316 caused by tampering and having the less pronounced minima could be distinguished from first impedance curve 314 by implementations of the present invention.

Tampering may not affect resistor 304 but instead may change the properties of either inductor 306 and/or capacitor 308. These changes to inductor 306 and/or capacitor 308 generally do not change the "Q" but instead shift the impedance curve and resonant frequency from a first frequency ($F_1$) to a second frequency ($F_2$) associated with third impendence curve 318 of FIG. 3B. Series-resonant circuit 300 operates according to third impedance curve 318 once the one or more inductor 306 and/or capacitor 308 components are deformed in this manner.

It should be recognized that the second frequency ($F_2$) and first frequency ($F_1$) are described as examples and it is not required that the second frequency ($F_2$) be either greater than or less than first frequency ($F_1$). Moreover, it is contemplated that tampering can simultaneously change resistor 304, inductor 306 and/or capacitor 308 resulting in a much more complex impedance curves than the ones plotted schematically in FIG. 3B.

Figure 3C:
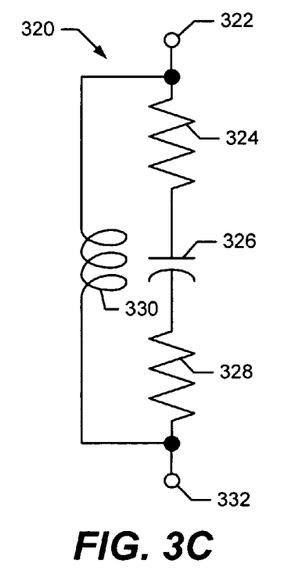
FIG. 3C is a schematic diagram of a parallel-resonant circuit in accordance with one implementation of the present invention.
Figure 3D:
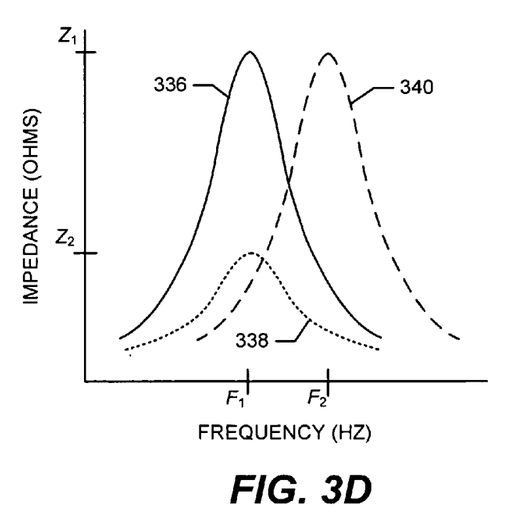
FIG. 3D is a graph illustrating the frequency response of a parallel-resonant circuit in accordance with one implementation of the present invention.

FIG. 3C and FIG. 3D depict a parallel-resonant circuit 320 and corresponding impedance curves in accordance with another implementation of the present invention. As a point of reference, the circuit previously described in FIG. 2A can also be classified as a parallel-resonant circuit. In this example, parallel-resonant circuit 320 includes a lead 322 coupled in series with a first resistor 324, a capacitor 326, a second resistor 328 and lead 332. Inductor 330 is coupled in parallel to these aforementioned circuit elements by way of lead 322 and lead 332 as illustrated in FIG. 3C. Unlike the series-resonant circuit 320, the impedance of the parallel-resonant circuit 320 increases as an electromagnetic wave approaches the resonant frequency of the circuit. In this example, the impedance of an untampered with parallel-resonant circuit 320 increases to either $Z_1$ or $Z_2$ as the electromagnetic wave approaches first resonant frequency ($F_1$).

Tampering with parallel-resonant circuit 320 can alter the resistance associated with resistor 324 and resistor 328 as well as change the Q for the circuit. In this example, tampering that increases the resistance from resistor 324 and/or resistor 328 decreases the Q for the circuit. Instead of parallel-resonant circuit 320 operating according to a fourth impedance curve 336 in FIG. 3D, tampering in this manner causes parallel-resonant circuit 320 to operate according to fifth impedance curve 338. As it is illustrated, fifth impedance curve 338 has lower overall impedance and a less pronounced maximum impedance compared with fourth impedance curve 336.

Alternatively, tampering with parallel-resonant circuit 320 may instead change characteristics of inductor 330 and/or capacitor 326. If this occurs, the resonant frequency of circuit 320 changes from operating at frequency $F_1$ to operating at frequency $F_2$ instead. Sixth impedance curve 340 illustrates a curve having a resonant frequency $F_2$ that appears greater than an initial resonant frequency $F_1$ in the untampered state of parallel-resonant circuit 320.

Similar to the description of FIG. 3B, it should be recognized that the second frequency ($F_2$) and first frequency ($F_1$) in FIG. 3D are described as examples and it is not required or necessarily the case that the second frequency ($F_2$) be either greater than or less than first frequency ($F_1$). Moreover, it is contemplated that tampering can simultaneously change first resistor 324, second resistor 328, inductor 330 and/or capacitor 308 resulting in a much more complex impedance curves than the ones plotted schematically in FIG. 3D.

Figure 4:
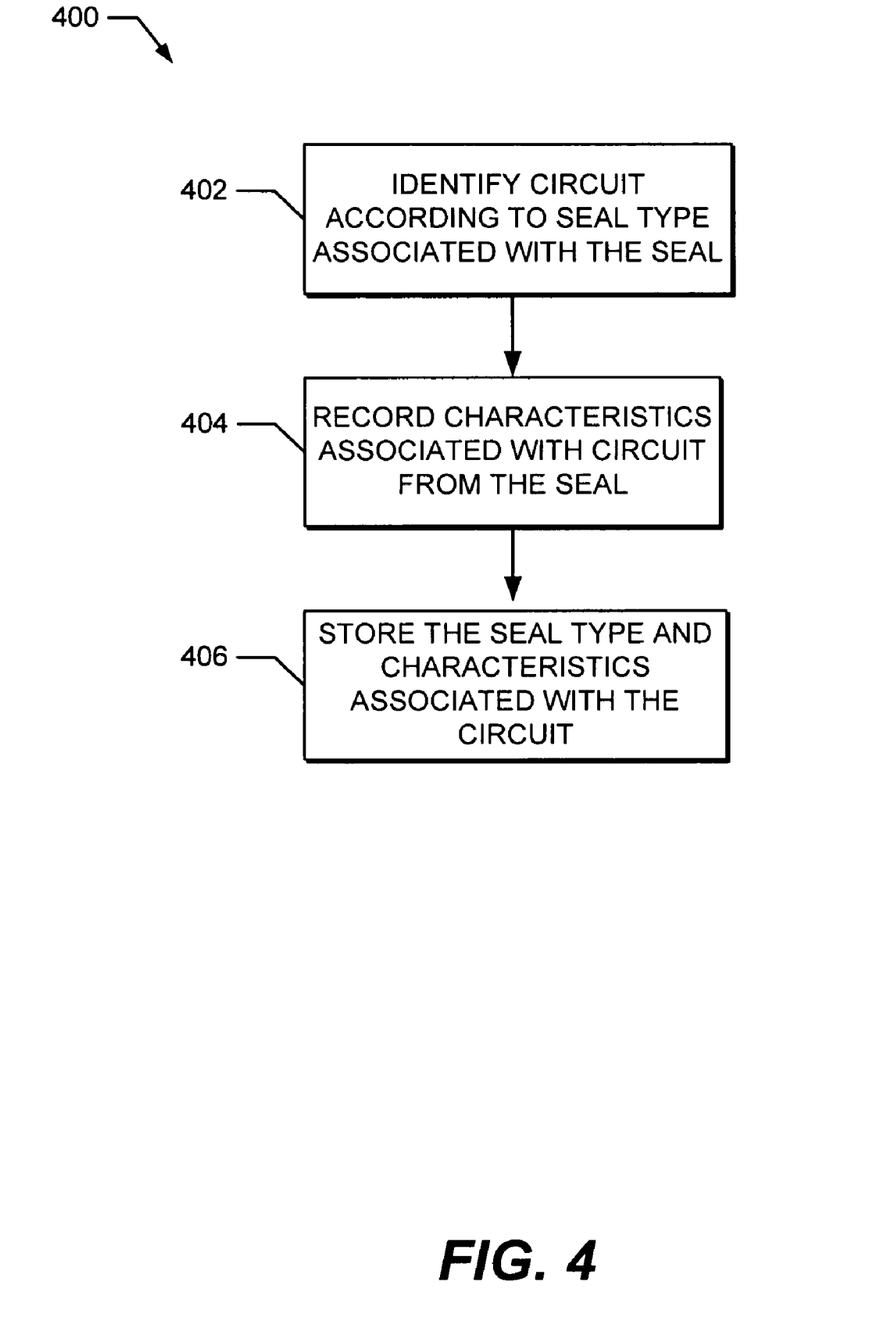
FIG. 4 is a flowchart diagram of the operations pertaining to closing a package with a seal containing an embedded circuit in accordance with one implementation of the present invention.

FIG. 4 is a flowchart diagram of the operations for identifying a seal in accordance with one implementation of the present invention. The seal is initially placed on a package having a product and ready for shipment or delivery. In one implementation, a reader or other device identifies the circuit on the sealed package according to the seal type associated with the seal (402). The identification of the seal type can be performed by recognizing one or more qualities of the seal. Because many different seals may be used for different products, each seal needs to be readily identified by the scanner or other machine according to certain identifiable characteristics or features. The reader may classify a seal according to: a color, a shape, a size, a barcode identifier printed on the seal, a character string on the seal or a symbolic identifier on the seal. For example, one seal may have a square shape while another seal may be round or triangular in shape. The reader can also use various optical recognition techniques to read characters, symbols or barcode identifiers printed on the seal.

Next, the reader records one or more characteristics from the circuit associated with the seal (404). The reader scans the circuit in the seal on the package with an electromagnetic wave and then measures the waveform or signal resulting from the electromagnetic wave to determine the one or more characteristics associated with the circuit. To make sure the seal is not defective, one implementation of the present invention optionally determines if the seal and seal type are at least operating within an acceptable predetermined range of values for the seal type. Seal types may be different combinations of circuit components (i.e., resistors, inductors and capacitors) making up either parallel-resonant or series-resonant circuits. If the characteristics of the seal are already outside a certain operating range or predetermined range of values prior to shipment or delivery then the seal may be deemed defective. For example, the predetermined range of values can include a range of Q values or a range of resonant frequencies for the untampered seal and circuit.

In the event the seal as applied to the package is not considered defective, implementations of the present invention record the particular impedance response or other electrical characteristics for the seal. Recording the measured impedance curves for each type of seal eventually creates an acceptable range of values for a given untampered seal type.

It is also possible to identify each seal individually if a tag is applied to a product in a package being sealed. The tag can be a radio frequency identification (RFID) tag or a bar code tag unique to the product contained in the package. Implementations of the present invention read the tag to determine the identifier associated with the product in the package and record this information along with other characteristics of the seal in the database. Instead of an acceptable range of values, the tag and identifier is used to identify a specific product, package and seal as well as associate a particular impedance curve or values with the untampered seal.

Implementations of the present invention store the seal type and one or more characteristics associated with the circuit from the seal to establish an untampered state for the seal (406). One implementation of the present invention may record this information in a local database while another implementation may record the characteristics of the seal in a database accessible over network by several remote computers. For example, the characteristics stored in the database typically can include a resonant frequency and Q for the seal and circuit considered to be untampered. In addition, an identifier from the RFID, barcode or other tag is also stored if the seal is to be reference individually rather than more generally by its particular seal type.

Figure 5:
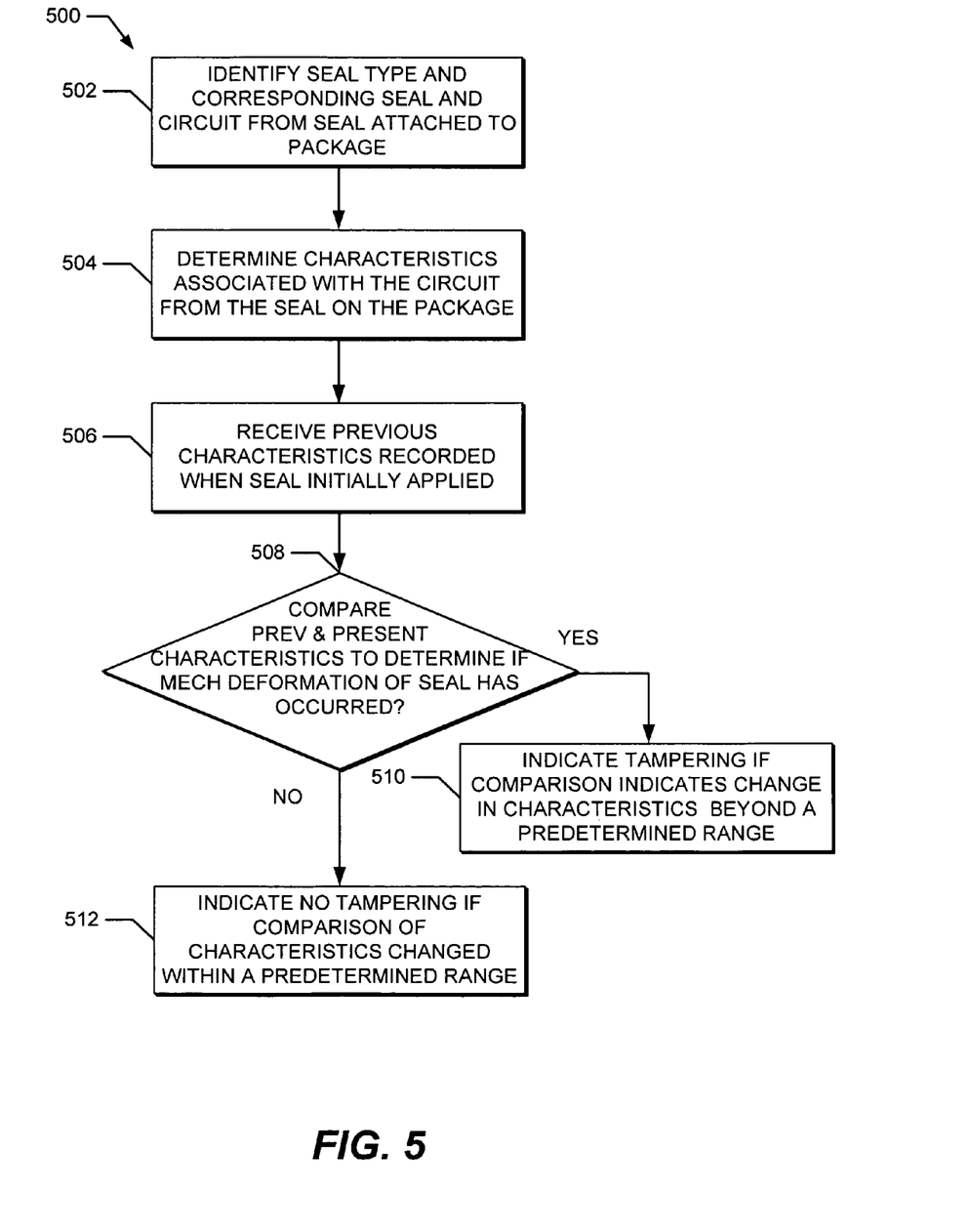
FIG. 5 is a flowchart diagram of the operations pertaining to detecting tampering to a package with a seal containing an embedded circuit in accordance with one implementation of the present invention.

FIG. 5 is another flowchart diagram of the operations to determine if a package may have been tampered with in accordance with one implementation of the present invention. The tampering determination can be performed at any point during delivery or shipping. Initially, a reader device or machine determines a seal type and corresponding seal and circuit from the seal attached to package (502). As previously described, identifying the seal type can be performed by recognizing one or more qualities of the seal. Because many different seals may be used for different products, each seal needs to be readily identified by the scanner or other machine according to certain identifiable characteristics or features. The reader may classify a seal according to: a shape, a size, a barcode identifier printed on the seal, a character string on the seal or a symbolic identifier on the seal. For example, one seal may have a square shape while another seal may be round or triangular in shape. The reader can also use various optical recognition techniques to read characters, symbols or barcode identifiers printed on the seal.

Next, the reader or other device determines one or more characteristics associated with the circuit from the seal on the package (504). The reader scans the circuit in the seal with an electromagnetic wave and then measures the waveform or signal resulting from the electromagnetic wave to determine the one or more characteristics associated with the circuit. For example, the characteristics determined typically include a resonant frequency and Q for the circuit contained within the seal on the package.

It is also possible to identify each seal individually if a tag is present on a product being sealed in the package. As previously described, a tag associated with the product can be a radio frequency identification (RFID) tag or a bar code tag unique to the product. Implementations of the present invention read the tag associated with the product to determine the identifier associated with the product, package and seal and use this information along with other characteristics to detect tampering of the seal.

Implementations of the present invention then receive previous characteristics recorded when the seal was initially applied (506). These characteristics are generally stored in either a local or remote database and provide a baseline measurement of the seal prior to any possible tampering. If the package and seal has a tag and identifier then the previous characteristics are specific to the seal being investigated. For example, the identifier from a tag can be used to retrieve a specific impedance curve associated with the product and sealed package for the product. Alternatively, if the product in the sealed package is not uniquely identified by a tag then a range of values indicating an untampered stated for a type of seal are retrieved from a database and used instead.

In one implementation, mechanical deformation from possible tampering is determined by comparing the previously recorded characteristics with the present characteristics of the seal and sealed package (508). If an identifier for the product in a sealed package is included then the characteristics being compared are specific to the seal and circuit. For example, the identifier from a product can be cross referenced to retrieve the specific impedance curve associated with the sealed package prior to shipping and delivery. However, if the identifier from the sealed package is not provided or available then a range of acceptable characteristic values for the seal and circuit are retrieved and compared against the present characteristic values. Depending on the application, either of these different approaches may be acceptable.

In one case, implementations of the present invention determine no tampering has occurred if the comparison indicates that the characteristics have changed within a predetermined range of values (512). In practice a certain degree of mechanical deformation may occur to the seal on the sealed package during shipping and delivery. Accordingly, a certain amount of mechanical deformation can occur without the seal and packaged being considered compromised or tampered.

Alternatively, one implementation of the present invention may indicate tampering has occurred when the comparison indicates a change in the circuit's characteristics beyond a predetermined range or values (510). If sufficient mechanical deformation is greater than that attributed to shipping and delivery than the seal and sealed package are considered as possibly tampered. The sealed package considered to have been tampered with is removed and inspected further to determine of the product inside is counterfeit, missing or otherwise a knock-off of the originally shipped product.

While specific embodiments have been described herein for the purposes of illustration, various modifications may be made without departing from the spirit and scope of the invention. Accordingly, the invention is not limited to the above-described implementations, but instead is defined by the appended claims in light of their full scope of equivalents.

What is claimed is:

1. A seal for an individual package, comprising:
   a resonant circuit associated with an individual product contained in the individual package and having a predetermined resonant frequency that changes under mechanical deformation resulting from tampering;
   an attaching material coupled to the circuit for attaching the circuit to the package and printed with a first identifier to determine a seal type; and
   a storage area in the seal for storing a second identifier to individually identify the resonant circuit and for cross-referencing with a database the predetermined resonant frequency of the resonant circuit prior to potential tampering along with one or more characteristics of the seal to establish an untampered state for the seal and one or more predetermined qualities of the seal.

2. The circuit of claim 1 wherein the circuit includes circuit elements selected from a set including: a resistor, an inductor and a capacitor.

3. The circuit of claim 2 wherein the resistor has a resistance value selected from a predetermined range of resistance values.

4. The circuit of claim 2 wherein the circuit elements are coupled together as a resonant circuit.

5. The circuit of claim 2 wherein the circuit elements are operatively coupled together into a series-resonant circuit having a reduced impedance at a resonant frequency.

6. The circuit of claim 2 wherein the circuit elements are operatively coupled together into a parallel-resonant circuit having an increased impedance at a resonant frequency.

7. The seal of claim 1 wherein the mechanical deformation can result from tampering with the attaching seal.

8. The seal of claim 1 wherein the mechanical deformation of the circuit can result from one or more actions selected from a set of actions including: bending, breaking, burning, removing, stretching, cutting, heating, moistening, tearing and perforating.

9. The seal of claim 1 wherein the circuit is embedded under at least one layer of material forming the seal.

10. The seal of claim 1 wherein the circuit is laminated onto the attaching material.

11. The seal of claim 1 wherein the circuit is printed onto at least one layer of material forming the seal.

12. A method of sealing an individual package with a seal to detect tampering with the individual package, comprising:
   identifying a resonant circuit in the seal according to a first identifier printed on the sealed individual package holding an individual product and indicating a seal type of the seal;
   recording a predetermined resonant frequency and second identifier associated with the resonant circuit from the seal wherein a mechanical deformation of the seal changes the predetermined resonant frequency associated with the circuit from the seal; and
   storing the seal type and one or more characteristics associated with the circuit from the seal and the predetermined resonant frequency cross-referenced by the second identifier in a database to establish an untampered state for the seal and one or more predetermined qualities of the seal based upon the seal type.

13. The method of claim 12 wherein the storing further includes,
   reading a tag associated with the package to determine the second identifier for the package; and
   referencing the second identifier for the package along with the seal type and one or more characteristics associated with the resonant circuit from the seal.

14. The method of claim 12 wherein the tag associated with the package is selected from a set of tags including: a radio frequency identification (RFID) tag and a barcode tag.

15. The method of claim 12 wherein the seal type corresponds to a resonant circuit selected from a set of circuits including a series resistor-inductor-capacitor circuit and a parallel resistor-inductor-capacitor circuit.

16. The method of claim 12 wherein the one or more characteristics associated with the resonant circuit includes a resonant frequency.

17. The method of claim 12 wherein the one or more characteristics associated with the resonant circuit includes the Q of a resonant circuit.

18. The method of claim 12 wherein the seal type is identified according to one or more qualities of the seal selected from a set including: a shape, a size, a barcode identifier, a character string and a symbol.

19. The method of claim 12 wherein recording the one or more characteristics associated with the resonant circuit includes:
   scanning the resonant circuit on the sealed package with an electromagnetic wave; and
   measuring a waveform resulting from the electromagnetic wave to determine The one or more characteristics associated with the resonant circuit.

20. The method of claim 12 wherein the seal is not considered an acceptable seal on the package if the seal characteristics are not within a predetermined range of values for the seal type.

21. The method of claim 12 wherein the seal type and one or more characteristics associated with the resonant circuit are stored in a database accessible over a network.

22. A method of detecting tampering to an individual package having a seal, comprising:
   identifying a seal type and corresponding seal and resonant circuit for the seal attached to the package according to a first identifier printed on the seal;
   determining a resonance frequency associated with the resonant circuit from the seal on the individual package and in accordance with the seal type;
   receiving one or more previous characteristics and a predetermined resonance frequency recorded in a database when the seal was initially applied to the package and cross-referenced in the database by a second identifier associated with the resonant circuit; and
   comparing the resonance frequency determined with the predetermined resonance frequency received to determine if a mechanical deformation of the seal indicative of tampering with the individual package and an individual product contained within may have occurred.

23. The method of claim 22 wherein the seal type corresponds to a resonant circuit selected from a set of circuits including a series resistor-inductor-capacitor circuit and a parallel resistor-inductor-capacitor circuit.

24. The method of claim 22 wherein the mechanical deformation of the seal changes the one or more characteristics associated with the resonant circuit from the seal.

25. The method of claim 22 wherein the one or more characteristics associated with the resonant circuit includes a Q of a resonant circuit.

26. The method of claim 22 wherein the seal type is identified according to one or more qualities of the seal selected from a set including: a shape, a size, a barcode identifier, a character string and a symbol.

27. The method of claim 22 wherein determining the one or more characteristics associated with the resonant circuit from the seal includes:
   scanning the resonant circuit on the sealed individual package with an electromagnetic wave; and
   measuring a waveform resulting from the electromagnetic wave to determine the one or more characteristics associated with the resonant circuit.

28. The method of claim 22 farther comprising,
   indicating that individual package and individual product have been tampered with if the comparison results in differences between the resonance frequency determined and the predetermined resonance frequency received exceeding a predetermined tampering range.

29. The method of claim 22 wherein the one or more previous characteristics recorded when the seal was initially applied to the individual package are received from a database accessible over a network.

30. An apparatus for sealing an individual package with a seal to detect tampering with the individual package, comprising:
   means for identifying a resonant circuit in the seal according to a first identifier printed on the sealed individual package holding an individual product and indicating a seal type of the seal;
   means for recording a predetermined resonant frequency and second identifier associated with the resonant circuit from the seal wherein a mechanical deformation of the seal changes the predetermined resonant frequency associated with the circuit from the seal; and
   means for storing the seal type and one or more characteristics associated with the circuit from the seal and the predetermined resonant frequency cross-referenced by the second identifier in a database to establish an untampered state for the seal and one or more predetermined qualities of the seal based upon the seal type.

31. An apparatus for detecting tampering to an individual package having a seat, comprising:
- means for identifying a seal type and corresponding seal and resonant circuit for the seal attached to the package according to a first identifier printed on the seal;
- means for determining a resonance frequency associated with the resonant circuit from the seal on the individual package and in accordance with the seal type;
- means for receiving one or more previous characteristics and a predetermined resonance frequency recorded in a database when the seal was initially applied to the package and cross-referenced in the database by a second identifier associated with the resonant circuit; and
- means for comparing the resonance frequency determined with the predetermined resonance frequency received to determine if a mechanical deformation of the seal indicative of tampering with the individual package and an individual product contained within may have occurred.

* * * * *

UNITED STATES PATENT AND TRADEMARK OFFICE
CERTIFICATE OF CORRECTION

PATENT NO.         : 7,372,366 B2                                       Page 1 of 1
APPLICATION NO.  : 11/125559
DATED              : May 13, 2008
INVENTOR(S)        : Geoff Lyon et al.

It is certified that error appears in the above-identified patent and that said Letters Patent is hereby corrected as shown below:

In column 11, line 57, in Claim 19, delete "The" and insert -- the --, therefor.

In column 12, line 39, In Claim 28, delete "farther" and insert -- further --, therefor.

In column 13, line 2, in Claim 31, delete "seat" and insert -- seal --, therefor.

Signed and Sealed this

Thirtieth Day of June, 2009

JOHN DOLL
*Acting Director of the United States Patent and Trademark Office*